US009778397B2

(12) United States Patent
Ryu et al.

(10) Patent No.: US 9,778,397 B2
(45) Date of Patent: Oct. 3, 2017

(54) POLYMERIZABLE COMPOSITION, OPTICAL MATERIAL, AND MANUFACTURING METHOD OF THE SAME

(71) Applicant: MITSUI CHEMICALS, INC., Minato-ku, Tokyo (JP)

(72) Inventors: Akinori Ryu, Arao (JP); Kouji Suesugi, Arao (JP)

(73) Assignee: MITSUI CHEMICALS, INC., Tokyo (JP)

( * ) Notice: Subject to any disclaimer, the term of this patent is extended or adjusted under 35 U.S.C. 154(b) by 0 days.

(21) Appl. No.: 14/442,946

(22) PCT Filed: Nov. 15, 2013

(86) PCT No.: PCT/JP2013/080936
§ 371 (c)(1),
(2) Date: May 14, 2015

(87) PCT Pub. No.: WO2014/077369
PCT Pub. Date: May 22, 2014

(65) Prior Publication Data
US 2015/0331147 A1    Nov. 19, 2015

(30) Foreign Application Priority Data
Nov. 16, 2012  (JP) .................. 2012-251913

(51) Int. Cl.
C08G 18/20 (2006.01)
G02B 1/04 (2006.01)
G02B 1/14 (2015.01)
G02B 1/11 (2015.01)
G02C 7/02 (2006.01)
C08G 18/75 (2006.01)
C08G 18/38 (2006.01)
C08G 18/72 (2006.01)

(52) U.S. Cl.
CPC ......... *G02B 1/041* (2013.01); *C08G 18/2027* (2013.01); *C08G 18/3876* (2013.01); *C08G 18/722* (2013.01); *C08G 18/758* (2013.01); *G02B 1/11* (2013.01); *G02B 1/14* (2015.01); *G02C 7/02* (2013.01); *G02C 2202/16* (2013.01)

(58) Field of Classification Search
CPC .................. C08G 18/2027; C08G 18/3876
USPC .......................................................... 528/76
See application file for complete search history.

(56) References Cited

U.S. PATENT DOCUMENTS

| 5,693,738 | A | 12/1997 | Okazaki et al. | |
|---|---|---|---|---|
| 2004/0026658 | A1* | 2/2004 | Yoshimura | C08G 18/3876 252/183.11 |
| 2004/0122201 | A1* | 6/2004 | Yoshimura | C08G 18/246 528/44 |
| 2007/0270548 | A1 | 11/2007 | Bojkova et al. | |
| 2007/0270549 | A1 | 11/2007 | Szymanski et al. | |
| 2008/0097045 | A1* | 4/2008 | Isahaya | C08G 18/12 525/457 |
| 2008/0125525 | A1 | 5/2008 | Bojkova | |
| 2008/0125570 | A1 | 5/2008 | Bojkova | |
| 2008/0160318 | A1 | 7/2008 | Senkfor et al. | |
| 2009/0259001 | A1 | 10/2009 | Kousaka | |
| 2013/0116357 | A1* | 5/2013 | Laas | C08G 18/3876 521/172 |
| 2013/0231425 | A1 | 9/2013 | Takemura et al. | |

FOREIGN PATENT DOCUMENTS

| CN | 1119195 A | 3/1996 |
|---|---|---|
| EP | 0676429 A2 | 10/1995 |
| EP | 1099721 A1 | 5/2001 |
| EP | 1518873 A2 | 3/2005 |
| JP | 03-084021 A | 4/1991 |
| JP | 08-208792 A | 8/1996 |
| JP | 10-231344 A | 9/1998 |
| JP | 2950862 B2 | 9/1999 |
| JP | 2002-234997 A | 8/2002 |
| JP | 2003-026753 A | 1/2003 |
| JP | 2005-121679 A | 5/2005 |
| JP | 2005-163008 A | 6/2005 |
| JP | 2005-281527 A | 10/2005 |
| JP | 2005-345684 A | 12/2005 |
| JP | 2006-265408 A | 10/2006 |
| JP | 2009-169391 A | 7/2009 |
| JP | 2009-536256 A | 10/2009 |
| WO | WO 2007/131149 A1 | 11/2007 |
| WO | WO 2008/023603 A1 | 2/2008 |
| WO | WO 2008/026727 A1 | 3/2008 |
| WO | WO 2012/010524 A1 | 1/2012 |
| WO | WO 2012/066744 A1 | 5/2012 |

OTHER PUBLICATIONS

International Search Report (PCT/ISA/210) mailed on Feb. 25, 2014, by the Japanese Patent Office as the International Searching Authority for International Application No. PCT/JP2013/080936.
Extended Search Report issued by the European Patent Office in corresponding European Patent Application No. 13854323.6 on Oct. 26, 2015 (7 pages).
Office Action issued by the Chinese Patent Office in corresponding Chinese Patent Application No. 201380057315.3 on Aug. 3, 2016 (5 pages).

* cited by examiner

*Primary Examiner* — Mike M Dollinger
(74) *Attorney, Agent, or Firm* — Buchanan, Ingersoll & Rooney PC

(57) ABSTRACT

The polymerizable composition of the present invention contains (A) an alicyclic isocyanate compound (a1) having two or more functional groups and/or an aliphatic isocyanate compound (a2) having two or more functional groups, (B) a thiol compound having one or more sulfide bonds and/or one or more ester bonds and having two or more functional groups, and (C) an imidazole-based curing catalyst, in which the amount of the imidazole-based curing catalyst (C) is 5 ppm to 3,000 ppm with respect to the total amount of the isocyanate compound (A) and the thiol compound (B).

9 Claims, No Drawings

POLYMERIZABLE COMPOSITION, OPTICAL MATERIAL, AND MANUFACTURING METHOD OF THE SAME

TECHNICAL FIELD

The present invention relates to a polymerizable composition, an optical material, and a manufacturing method of the same.

BACKGROUND ART

Plastic lenses are lighter than inorganic lenses, are not easily broken, and are dyeable. Therefore, they have been rapidly become widespread and are used for optical elements such as spectacle lenses and camera lenses. Up to now, various resins for lenses have been developed and used, and typical examples thereof include a thiourethane resin obtained from a polymerizable composition which contains an isocyanate compound and a thiol compound.

For example, the following Patent Documents 1 to 5 relate to plastic lenses comprised of the thiourethane resin.

Patent Documents 1 and 2 disclose a polymerizable composition obtained by mixing a prepolymer, which is obtained by reacting sulfur with an epithio group-containing compound by using an imidazole-based catalyst as a vulcanization accelerator, with a polyisocyanate compound and a polythiol compound, and a plastic lens obtained from the composition.

Patent Document 3 discloses a photosensitive resin composition containing a thiourethane compound, which is obtained from a thiol compound and an isocyanate compound, and a photopolymerization initiator such as an imidazole compound.

Patent Document 4 discloses a process for producing a polythiourethane resin in which a polythiol oligomer is reacted with a poly(thio)isocyanate group-containing compound. According to the document, the polythiol oligomer is obtained by reacting a polythiol compound having two or more functional groups with sulfur by using an imidazole-based catalyst.

Patent Document 5 discloses a polymerizable composition containing (A) a compound having one or more mercapto groups, (B1) a polyurethane prepolymer and/or a polythiourethane prepolymer having terminals totally or partially composed of a mercapto group, and (C) a polyisocyanate compound and/or a polyisothiocyanate compound. According to the document, when the composition is heated and polymerized in the presence of a curing catalyst such as imidazoles, a resin can be produced. However, the document does not specifically disclose a case of using imidazoles.

RELATED DOCUMENT

Patent Document

[Patent Document 1] Japanese Unexamined Patent Publication No. 2005-121679
[Patent Document 2] Japanese Unexamined Patent Publication No. 2005-281527
[Patent Document 3] WO2008/023603
[Patent Document 4] WO2008/026727
[Patent Document 5] Japanese Unexamined Patent Publication No. 2006-265408

DISCLOSURE OF THE INVENTION

In optical materials such as plastic lenses obtained from the polymerizable compositions described in the above documents, striae or cloudiness is caused in some cases. This exerts a negative influence on the performance of the optical materials and decreases yield of products in some cases.

As a result of performing intensive research to solve the above problem, the present inventors found that the use of a specific curing catalyst in a predetermined amount can inhibit cloudiness or striae of polythiourethane-based resin lenses.

The present invention includes the following.

[1] A polymerizable composition containing: (A) an alicyclic isocyanate compound (a1) having two or more functional groups and/or an aliphatic isocyanate compound (a2) having two or more functional groups; (B) a thiol compound having one or more sulfide bonds and/or one or more ester bonds and having two or more functional groups; and (C) an imidazole-based curing catalyst, in which the amount of the imidazole-based curing catalyst (C) is 5 ppm to 3,000 ppm with respect to the total amount of the isocyanate compound (A) and the thiol compound (B).

[2] The polymerizable composition described in [1], in which the alicyclic isocyanate compound (a1) is at least one kind selected from the group consisting of 1,3-bis(isocyanatomethyl)cyclohexane, 1,4-bis(isocyanatomethyl)cyclohexane, bis(4-isocyanatocyclohexyl)methane, bis(isocyanatomethyl)-bicyclo[2.2.1]heptane, and isophorone diisocyanate, and the aliphatic isocyanate compound (a2) is at least one kind selected from the group consisting of m-xylylenediisocyanate, hexamethylene diisocyanate, and pentamethylene diisocyanate.

[3] The polymerizable composition described in [1] or [2], in which in the thiol compound (B), the thiol compound having one or more sulfide bonds and two or more functional groups is at least one kind selected from the group consisting of 4-mercaptomethyl-1,8-dimercapto-3,6-dithiaocatane, 4,8-, 4,7-, or 5,7-dimercaptomethyl-1,11-dimercapto-3,6,9-trithiaundecane, bis(mercaptoethyl) sulfide, 2,5-bis(mercaptomethyl)-1,4-dithiane, 1,1,3,3-tetrakis(mercaptomethylthio)propane, 4,6-bis(mercaptomethylthio)-1,3-dithiane, and 2-(2,2-bis(mercaptomethylthio)ethyl)-1,3-dithietane.

[4] The polymerizable composition described in any one of [1] to [3], in which in the thiol compound (B), the thiol compound having one or more ester bonds and two or more functional groups is at least one kind selected from the group consisting of pentaerythritol tetrakis(2-mercaptoacetate), pentaerythritol tetrakis(3-mercaptopropionate), and a thiol compound represented by the following Formula (1).

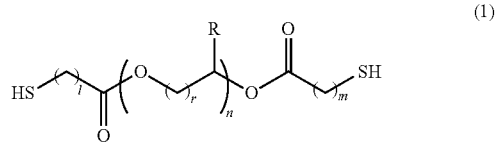

(1)

In the formula, each of 1, m, and r independently represents an integer of 1 to 4; n represents an integer of 1 to 3; R represents hydrogen or a methyl group; and when there is a plurality of Rs, Rs may be the same as or different from each other.

[5] The polymerizable composition described in any one of [1] to [4], in which the imidazole-based curing catalyst (C) includes at least one kind of compounds represented by the following Formula (2).

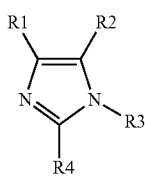

In the formula, each of R1, R2, R3, and R4 independently represents hydrogen, a mercapto group, a cyano group, an alkyl group which may be substituted, or a phenyl group which may be substituted; and R1, R2, R3, and R4 may be the same as or different from each other.

[6] The polymerizable composition described in any one of [1] to [5], in which the imidazole-based curing catalyst (C) is at least one kind selected from the group consisting of dimethylimidazole and benzylmethylimidazole.

[7] The polymerizable composition described in any one of [4] to [6], in which in the thiol compound represented by Formula (1), each of 1 and m independently represents an integer of 1 to 2, r represents an integer of 1 to 3, and n represents 1 or 2.

[8] An optical material comprised of the polymerizable composition described in any one of [1] to [7].

[9] A manufacturing method of an optical material, including a step of casting the polymerizable composition described in any one of [1] to [7] into a mold; and a step of polymerizing the polymerizable composition by heating the composition.

[10] A plastic spectacle lens in which a primer layer, a hard coat layer, and an antireflection layer are laminated in this order over a substrate comprised of the polymerizable composition described in any one of [1] to [7].

[11] A manufacturing method of a plastic spectacle lens, including a step of casting the polymerizable composition described in any one of [1] to [7] into a mold; a step of obtaining a lens substrate by polymerizing the polymerizable composition by heating the composition; and a step of forming a primer layer, a hard coat layer, and an antireflection layer in this order over at least one surface of the lens substrate.

According to the polymerizable composition of the present invention, it is possible to provide a plastic lens which has excellent optical characteristics such as refractive index and in which cloudiness or striae are inhibited.

DESCRIPTION OF EMBODIMENTS

The polymerizable composition of the present invention contains (A) an alicyclic isocyanate compound (a1) having two or more functional groups and/or an aliphatic isocyanate compound (a2) having two or more functional groups, (B) a thiol compound having one or more sulfide bonds and/or one or more ester bonds and having two or more functional groups, and (C) an imidazole-based curing catalyst. The amount of the imidazole-based curing catalyst (C) is 5 ppm to 3,000 ppm with respect to the total amount of the isocyanate compound (A) and the thiol compound (B).

Hereinafter, each of the components will be described.

[Isocyanate Compound (A)]

The isocyanate compound (A) is the alicyclic isocyanate compound (a1) having two or more functional groups and/or the aliphatic isocyanate compound (a2) having two or more functional groups.

Examples of the isocyanate compound (A) include one or more kinds of compound selected from compounds included in the alicyclic isocyanate compound (a1), one or more kinds of compound selected from compounds included in the aliphatic isocyanate compound (a2), and a combination of one or more kinds of compound selected from compounds included in the alicyclic isocyanate compound (a1) and one or more kinds of compound selected from compounds included in the aliphatic isocyanate compound (a2).

Furthermore, the isocyanate compound (A) may be in the form of a monomer, a modified product, and/or a mixture of a monomer and a modified product. Examples of the modified product of isocyanate include a multimer, a biuret-modified product, an allophanate-modified product, an oxadiazine trione-modified product, a polyol-modified product, and the like. Examples of the multimer include a dimer such as uretdione, uretonimine, or carbodimide and a multimer consisting of three or more monomers, such as isocyanurate or imino oxadiazine dione. Examples of the modified product of aliphatic polyisocyanate preferably include a multimer of aliphatic polyisocyanate and more preferably include an isocyanurate product of aliphatic polyisocyanate.

In the present invention, as the isocyanate compound (A), one or more kinds selected from the alicyclic isocyanate compound (a1) and the aliphatic isocyanate compound (a2) are preferably used.

The alicyclic isocyanate compound (a1) having two or more functional groups is a compound which has a ring-like skeleton other than an aromatic ring and has two or more isocyanato groups. Specific examples of the alicyclic isocyanate compound (a1) include 1,3-bis(isocyanatomethyl)cyclohexane, 1,4-bis(isocyanatomethyl)cyclohexane, bis(4-isocyanatocyclohexyl)methane, bis(isocyanatomethyl)-bicyclo[2.2.1]heptane, isophorone diisocyanate, and the like, and at least one kind of these can be used.

Bis(isocyanatomethyl)-bicyclo[2.2.1]heptane is a mixture of isomers of 2,5-bis(isocyanatomethyl)-bicyclo[2.2.1]heptane and 2,6-bis(isocyanatomethyl)-bicyclo[2.2.1]heptane. In the present invention, the compound comprised of the mixture of isomers is used as one kind of compound.

In the present invention, as the alicyclic isocyanate compound (a1), one kind of bis(4-isocyanatocyclohexyl)methane or bis(isocyanatomethyl)-bicyclo[2.2.1]heptane is preferably used, or alternatively, two kinds thereof are preferably used in combination.

The aliphatic isocyanate compound (a2) having two or more functional groups is a compound which has an alkylene chain having 1 to 15 carbon atoms and has two or more isocyanato groups.

Examples of the aliphatic isocyanate compound (a2) include pentamethylene diisocyante, hexamethylene diisocyanate, heptamethylene diisocyanate, octamethylene diisocyanate, 2,2-dimethylpentane diisocyanate, 2,2,4-trimethylhexane diisocyanate, 2,4,4-trimethylhexamethylene diisocyanate, 1,6,11-undecatriisocyanate, 1,3,6-hexamethylene triisocyanate, 1,8-diisocyanato-4-isocyanatomethyl octane, bis(isocyanatoethyl)carbonate, bis(isocyanatoethyl)ether, o-xylylene diisocyanate, m-xylylene diisocyanate, p-xylylene diisocyanate, and the like, and at least one kind of these can be used.

In the present invention, as the aliphatic isocyanate compound (a2), pentamethylene diisocyanate, hexamethylene diisocyanate, or m-xylylene diisocyanate is preferably used. From the viewpoint of refractive index of the obtained resin, m-xylylene diisocyanate is more preferably used.

[Thiol compound (B)]

The thiol compound (B) is a thiol compound having one or more sulfide bonds and/or one or more ester bonds and having two or more functional groups.

Specific examples of the thiol compound (B) include a thiol compound (b1) having one or more sulfide bonds and two or more functional groups (hereinafter, the compound will be abbreviated to "thiol compound (b1)" in some cases), a thiol compound (b2) having one or more ester bonds and two or more functional groups (hereinafter, the compound will be abbreviated to "thiol compound (b2)" in some cases), and a thiol compound (b3) having one or more ester bonds and one or more sulfide bonds and having two or more functional groups (hereinafter, the compound will be abbreviated to "thiol compound (b3)" in some cases).

Examples of the thiol compound (B) include one or more kinds of compound selected from compounds included in any one of the thiol compounds (b1) to (b3), one or more kinds of compound selected from compounds included in any two out of the thiol compounds (b1) to (b3), and one or more kinds of compound selected from compounds included in the thiol compounds (b1) to (b3).

In the present invention, as the thiol compound (B), one or more kinds selected from the thiol compound (b1) and the thiol compound (b2) are preferably used. Furthermore, a compound selected only from the thiol compound (b1) or one or more kinds of compound selected from compounds included in the thiol compound (b1) can be more preferably used in combination with one or more kinds of compound selected from compounds included in the thiol compound (b2).

The thiol compound (b1) is a compound which has one or more sulfide bonds and has two or more SH groups.

Specific examples of the thiol compound (b1) include 4-mercaptomethyl-1,8-dimercapto-3,6-dithiaoctane, 4,8-, 4,7- or 5,7-dimercaptomethyl-1,11-dimercapto-3,6,9-trithiaundecane, tetrakis(mercaptomethyl)methane, bis(mercaptomethyl)sulfide, 2,5-bis(mercaptomethyl)-1,4-dithiane, bis(mercaptomethyl)disulfide, bis(mercaptoethyl)sulfide, bis(mercaptoethyl)disulfide, bis(mercaptomethylthio)methane, bis(2-mercaptoethylthio)methane, 1,2-bis(mercaptomethylthio)ethane, 1,2-bis(2-mercaptoethylthio)ethane, 1,3-bis(mercaptomethylthio)propane, 1,3-bis(2-mercaptoethylthio)propane, 1,2,3-tris(mercaptomethylthio)propane, 1,2,3-tris(2-mercaptoethylthio)propane, 1,2,3-tris(3-mercaptopropylthio)propane, 1,1,3,3-tetrakis(mercaptomethylthio)propane, 4,6-bis(mercaptomethylthio)-1,3-dithiane, 2-(2,2-bis(mercaptomethylthio)ethyl)-1,3-dithietane, tetrakis(mercaptomethylthiomethyl)methane, tetrakis(2-mercaptoethylthiomethyl)methane, bis(2,3-dimercaptopropyl)sulfide, and the like, and at least one kind of these can be used.

In the present invention, as the thiol compound (b1), at least one kind selected from the group consisting of 4-mercaptomethyl-1,8-dimercapto-3,6-dithiaoctane, 4,8-, 4,7-, or 5,7-dimercaptomethyl-1,11-dimercapto-3,6,9-trithiaundecane, bis(mercaptoethyl)sulfide, 2,5-bis(mercaptomethyl)-1,4-dithiane, 1,1,3,3-tetrakis(mercaptomethylthio)propane, 4,6-bis(mercaptomethylthio)-1,3-dithiane, and 2-(2,2-bis(mercaptomethylthio)ethyl)-1,3-dithietane is preferably used.

The thiol compound (b2) is a compound which has one or more ester bonds and has two or more SH groups.

Specific examples of the thiol compound (b2) include 2,3-dimercapto-1-propanol(3-mercaptopropionate), 3-mercapto-1,2-propanediol bis(2-mercaptoacetate), 3-mercapto-1,2-propanediol di(3-mercaptopropionate), trimethylolpropane tris(2-mercaptoacetate), trimethylolpropane tris(3-mercaptopropionate), trimethylolethane tris(2-mercaptoacetate), trimethylolethane tris(3-mercaptopropionate), pentaerythritol tetrakis(2-mercaptoacetate), pentaerythritol tetrakis(3-mercaptopropionate), pentaerythritol bis(3-mercaptopropionate), pentaerythritol tris(3-mercaptopropionate), glycerin tris(2-mercaptoacetate), glycerin tris(3-mercaptopropionate), 1,4-cyclohexanediol bis(2-mercaptoacetate), 1,4-cyclohexanediol bis(3-mercaptopropionate), hydroxymethylsulfide bis(2-mercaptoacetate), hydroxymethylsulfide bis(3-mercaptopropionate), thioglycolic acid bis(2-mercaptoethylester), thiodipropionic acid bis(2-mercaptoethylester), hydroxyethylsulfide (2-mercaptoacetate), hydroxyethylsulfide (3-mercaptopropionate), a thiol compound represented by the following Formula (1), and the like.

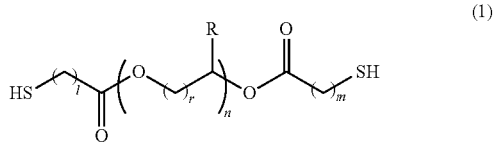

(1)

In the formula, each of l, m, and r independently represents an integer of 1 to 4, and n represents an integer of 1 to 3. R represents hydrogen or a methyl group, and when there is a plurality of Rs, Rs may be the same as or different from each other. Each of l and m preferably independently represents an integer of 1 to 2, r preferably represents an integer of 1 to 3, and n preferably represents 1 or 2.

The thiol compound represented by Formula (1) is a condensate of ethylene glycol, diethylene glycol, triethylene glycol, propylene glycol, and mercaptoalkyl carboxylic acid. Specific examples thereof include ethylene glycol bis(mercaptoacetate), ethylene glycol bis(mercaptopropionate), ethylene glycol bis(mercaptobutyrate), diethylene glycol bis(mercaptoacetate), diethylen glycol bis(mercaptopropionate), diethylene glycol bis(mercaptobutyrate), triethylene glycol bis(mercaptoacetate), triethylene glycol bis(mercaptopropionate), triethylene glycol bis(mercaptobutyrate), bis(3-mercaptopropionic acid) 1,4-butanediol, and the like. Among these, one kind can be used, or alternatively, two or more kinds can be used in combination.

As the thiol compound represented by Formula (1), diethylene glycol bis(mercaptopropionate) or bis(3-mercaptopropionic acid) 1,4-butanediol can be preferably used.

The thiol compound (b2) is preferably at least one kind selected from the group consisting of pentaerythritol tetrakis(2-mercaptoacetate), pentaerythritol tetrakis(3-mercaptopropionate), and the thiol compound represented by Formula (1).

In the present invention, as the thiol compound (b2), pentaerythritol tetrakis(3-mercaptopropionate), diethylene glycol bis(mercaptopropionate), or bis(3-mercaptopropionic acid) 1,4-butanediol can be more preferably used.

The thiol compound (b3) is a compound which has one or more ester bonds, one or more sulfide bonds, and two or more SH groups.

Specific examples of the thiol compound (b3) include 2,2'-thiodiethanol bis(2-mercaptoacetate), 2,2'-thiodiethanol bis(3-mercaptopropionate), thiodimethanol bis(2-mercaptoacetate), thiodimethanol bis(3-mercaptopropionate), and the like. Among these, one kind can be used, or alternatively, two or more kinds can be used in combination.

[Imidazole-based curing catalyst (C)]

The imidazole-based curing catalyst (C) is not particularly limited. As the catalyst, a compound represented by the following Formula (2) can be used, and the catalyst can contain at least one kind of the compound.

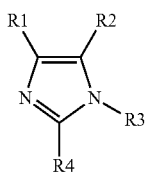

(2)

In the formula, each of R1, R2, R3, and R4 independently represents hydrogen, a mercapto group, a cyano group, an alkyl group which may be substituted, or a phenyl group which may be substituted. R1, R2, R3, and R4 may be the same as or different from each other.

The alkyl group which may be substituted is a substituted or unsubstituted alkyl group having 1 to 12 carbon atoms.

Examples of the substituent of the substituted alkyl group having 1 to 12 carbon atoms include a hydroxyl group, a cyano group, a mercapto group, and the like. Examples of the substituent of the substituted phenyl group include a hydroxyl group, a cyano group, a mercapto group, and the like.

Specific examples of the imidazole-based curing catalyst include 2-methylimidazole, 2-ethylimidazole, 2-ethyl-4-methylimidazole, 1-cyanoethyl-2-phenylimidazole, 1-cyanoethyl-2-phenylimidazolium trimellitate, 2-phenylimidazole, 2-mercapto-1-methylimidazole, dimethylimidazole, N-benzylimidazole, 1-phenylimidazole, 1-(2-cyanoethyl)-2-ethyl-4-methylimidazole, 2-isopropylimidazole, 4-methylimidazole, benzylmethylimidazole, imidazole, and the like.

Preferable examples thereof include dimethylimidazole and benzylmethylimidazole. Preferable examples of position isomers of dimethylimidazole and benzylmethylimidazole include 1,2-dimethylimidazole and 1-benzyl-2-methylimidazole.

In the present invention, from the viewpoint of manufacturing a plastic lens, in which cloudiness or striae are inhibited, with excellent efficiency, the imidazole-based curing catalyst (C) can be used in an amount of equal to or greater than 5 ppm, preferably in an amount of equal to or greater than 10 ppm, more preferably in an amount of equal to or greater than 50 ppm, and particularly preferably in an amount of equal to or greater than 100 ppm, with respect to the total amount of the isocyanate compound (A) and the thiol compound (B). Meanwhile, from the viewpoint of inhibiting cloudiness or striae of the plastic lens, and from the viewpoint of workability such as pot life, the upper limit thereof can be used in an amount of equal to or less than 3,000 ppm, preferably equal to or less than 2,000 ppm, and more preferably equal to or less than 1,000 ppm.

The amount of the imidazole-based curing catalyst (C) used can be set by appropriately combining the upper limit and the lower limit described above. The amount can be set to be 5 ppm to 3,000 ppm, preferably 5 ppm to 2,000 ppm, more preferably 5 ppm to 1,000 ppm, even more preferably 50 ppm to 1,000 ppm, and particularly preferably 100 ppm to 1,000 ppm. When the imidazole-based curing catalyst (C) is used in the amount described above, it is possible to obtain a plastic lens, in which cloudiness or striae are effectively inhibited, with excellent workability.

[Other Components]

The polymerizable composition of the present invention may further contain other additives such as an active hydrogen compound, an internal release agent, a resin modifier, a light stabilizer, a bluing agent, an ultraviolet absorber, an antioxidant, a coloring inhibitor, and a dye.

(Active Hydrogen Compound)

In the present invention, the polymerizable composition can further contain an active hydrogen compound other than the compound (A) and the compound (B).

Examples of the thiol compound as the active hydrogen compound in the present invention include an aliphatic thiol compound, an aromatic thiol compound, and the like.

The aliphatic thiol compound is a compound not containing a sulfide bond and an ester bond. Examples thereof include methanedithiol, 1,2-ethanedithiol, 1,2-propanedithiol, 1,3-propanedithiol, 1,4-butanedithiol, 1,5-pentanedithiol, 1,6-hexanedithiol, 1,2-cyclohexanedithiol, 3,4-dimethoxydibutane-1,2-dithiol, 2-methylcyclohexane-2,3-dithiol, 1,2-dimercaptopropyl methyl ether, 2,3-dimercaptopropyl methyl ether, bis(2-mercaptoethyl)ether, tetrakis(mercaptomethyl)methane, and the like.

Examples of the aromatic thiol compound include 1,2-dimercaptobenzene, 1,3-dimercaptobenzene, 1,4-dimercaptobenzene, 1,2-bis(mercaptomethyl)benzene, 1,4-bis(mercaptomethyl)benzene, 1,2-bis(mercaptoethyl)benzene, 1,4-bis(mercaptoethyl)benzene, 1,2,3-trimercaptobenzene, 1,2,4-trimercaptobenzene, 1,3,5-trimercaptobenzene, 1,2,3-tris(mercaptomethyl)benzene, 1,2,4-tris(mercaptomethyl)benzene, 1,3,5-tris(mercaptomethyl)benzene, 1,2,3-tris(mercaptoethyl)benzene, 1,3,5-tris(mercaptoethyl)benzene, 1,2,4-tris(mercaptoethyl)benzene, 2,5-toluenedithiol, 3,4-toluenedithiol, 1,4-naphthalenedithiol, 1,5-naphthalenedithiol, 2,6-naphthalenedithiol, 2,7-naphthalenedithiol, 1,2,3,4-tetramercaptobenzene, 1,2,3,5-tetramercaptobenzene, 1,2,4,5-tetramercaptobenzene, 1,2,3,4-tetrakis(mercaptomethyl)benzene, 1,2,3,5-tetrakis(mercaptomethyl)benzene, 1,2,4,5-tetrakis(mercaptomethyl)benzene, 1,2,3,4-tetrakis(mercaptoethyl)benzene, 1,2,3,5-tetrakis(mercaptoethyl)benzene, 1,2,4,5-tetrakis(mercaptoethyl)benzene, 2,2'-dimercaptobiphenyl, 4,4'-dimercaptobiphenyl, and the like.

(Internal Release Agent)

The polymerizable composition of the present invention can contain an internal release agent, for the propose that a molded product obtained from the composition is released better from a mold.

As the internal release agent, an acidic phosphoric acid ester can be used. Examples of the acidic phosphoric acid ester include a phosphoric acid monoester and a phosphoric acid diester. One kind of these can be used singly, or two or more kinds thereof can be used in the form of a mixture.

For example, it is possible to use Zelec UN manufactured by Stepan Company, interal release agents for MR manufactured by Mitsui Chemicals, Inc., a JP series manufactured by Johoku Chemical Co., Ltd., a Phosphanol series manufactured by Toho Chemical Industry Co., Ltd., an AP or DP series manufactured by Daihachi Chemical Industry Co., Ltd., and the like.

(Resin Modifier)

Moreover, in order to regulate various physical properties such as optical properties, impact resistance, and specific gravity of the obtained resin and to adjust viscosity or pot life of the composition, a resin modifier can be added to the polymerizable composition of the present invention, within a range that does not diminish the effects of the present invention.

Examples of the resin modifier include an episulfide compound, an alcohol compound, an amine compound, an epoxy compound, an organic acid and an anhydride thereof, an olefin compound including a (meth)acrylate compound, and the like.

(Light Stabilizer)

As the light stabilizer, a hindered amine-based compound can be used. Examples of the hindered amine-based compound include commercially available products such as Lowilite 76 and Lowilite 92 manufactured by Chemtura Corporation, Tinuvin 144, Tinuvin 292, and Tinuvin 765 manufactured by BASF Corporation, Adeka Stab LA-52 and LA-72 manufactured by Adeka Corporation, and JF-95 manufactured by Johoku Chemical Co., Ltd.

(Bluing Agent)

Examples of the bluing agent include substances that have an absorption band in a wavelength region from orange to yellow within a visible light region and function to adjust the color of an optical material comprised of a resin. More specifically, the bluing agent includes substances that are blue to violet in color.

(Ultraviolet Absorber)

Examples of the ultraviolet absorber include benzophenone-based ultraviolet absorbers such as 2,2'-dihydroxy-4-methoxybenzophenone, 2-hydroxy-4-acryloyloxybenzophenone, 2-hydroxy-4-acryloyloxy-5-tert-butylbenzophenone, and 2-hydroxy-4-acryloyloxy-2',4'-dichlorobenzophenone, triazine-based ultraviolet absorbers such as 2-[4-[(2-hydroxy-3-dodecyloxypropyl)oxy]-2]-hydroxyphenyl] 4,6-bis(2,4-dimethylphenyl)-1,3,5-triazine, 2-[4-(2-hydroxy-3-tridecyloxypropyl)oxy]-2-hydroxyphenyl]-4,6-bis(2,4-dimethylphenyl)-1,3,5-triazine, 2-[4-[(2-hydroxy-3-(2'-ethyl)hexyl)oxy]-2-hydroxyphenyl]-4,6-bis(2,4-dimethylphenyl)-1,3,5-triazine, 2,4-bis(2-hydroxy-4-butyloxyphenyl)-6-(2,4-bis-butyloxyphenyl)-1,3,5-triazine, and 2-(2-hydroxy-4-[1-octyloxycarbonylethoxy]phenyl)-4,6-bis(4-phenylphenyl)-1,3,5-triazine, benzotriazole-based ultraviolet absorbers such as 2-(2H-benzotriazol-2-yl)-4-methylphenol, 2-(2H-benzotriazol-2-yl)-4-tert-octylphenol, 2-(2H-benzotriazol-2-yl)-4,6-bis(1-methyl-1-phenylethyl)phenol, 2-(2H-benzotriazol-2-yl)-4,6-di-tert-pentylphenol, 2-(5-chloro-2H-benzotriazol-2-yl)-4-methyl-6-tert-butylphenol, 2-(5-chloro-2H-benzotriazol-2-yl)-2,4-tert-butylphenol, and 2,2'-methylene bis[6-(2H-benzotriazol-2-yl)-4-(1,1,3,3-tetramethylbutyl)phenol], and the like. Among these, benzotriazole-based ultraviolet absorbers such as 2-(2H-benzotriazol-2-yl)-4-tert-octylpnehol and 2-(5-chloro-2H-benzotriazol-2-yl)-4-methyl-6-tert-butylphenol are preferable. One kind of these ultraviolet absorbers can be used singly, or two or more kinds thereof can be used concurrently.

<Producing Method>

In the present invention, a molar ratio of the mercapto group in the thiol compound to the isocyanate group in the isocyanate compound is within a range of 0.8 to 1.2, preferably within a range of 0.85 to 1.15, and even more preferably within a range of 0.9 to 1.1. When the molar ratio is within the above range, it is possible to obtain a resin suitably used as an optical material, particularly, a plastic lens material for spectacles.

When a polymerizable composition is prepared by mixing a monomer to be used, a catalyst, an internal release agent, and other additives together, the mixing temperature is generally equal to or less than 25° C. From the viewpoint of pot life of the polymerizable composition, it is preferable to further reduce the temperature in some cases. However, when the solubility of the catalyst, the internal release agent, and the additives in the monomer is poor, they can be heated in advance and then dissolved in the monomer and a resin modifier in some case.

<Use>

By varying the type of mold at the time of cast polymerization, it is possible to diversify the form of the thiourethane resin obtained from the polymerizable composition of the present invention. Having a high refractive index and a high degree of transparency, the optical material of the present invention can be used as an optical resin for various purposes such as a plastic lens, a camera lens, a Light Emitting Diode (LED), a prism, optical fiber, an information recording substrate, and a filter. Particularly, the optical material of the present invention is suitable as an optical material such as a plastic lens, a camera lens, or a light emitting diode and as an optical element. That is, the polymerizable composition of the present invention can be suitably used as a polymerizable composition for optical use.

Examples of the plastic lens include a plastic spectacle lens comprised of a polythiourethane resin and a plastic polarizing lens in which a layer comprised of a polythiourethane resin is laminated over at least one surface of a polarizing film.

<Optical Material>

In the present invention, the optical material comprised of the thiourethane resin is not particularly limited. However, the optical material is preferably obtained by a manufacturing method which is cast polymerization including the following steps.

Step a: casting the polymerizable composition of the present invention into a mold Step b: polymerizing the polymerizable composition by heating the composition (Step a)

First, the polymerizable composition is casted into a mold (casting mold) held by a gasket, a tape, or the like. At this time, in many cases, depending on the properties required for the plastic lens to be obtained, if necessary, it is preferable to perform degassing processing under reduced pressure or filtration processing such as pressurization or pressure reduction.

(Step b)

The polymerization conditions are not limited since the conditions greatly vary with the makeup of the polymerizable composition, the type and amount of the catalyst used, the mold shape, and the like. However, the polymerization is performed for about 1 hour to 50 hours at a temperature of about −50° C. to 150° C. In some cases, the polymerizable composition is preferably cured for 1 hour to 25 hours by being kept at a temperature within a range of 10° C. to 150° C. or by being gradually heated within the temperature range.

If necessary, the optical material comprised of the thiourethane resin of the present invention may be subjected to processing such as annealing. The processing is generally performed within a temperature range of 50° C. to 150° C., preferably within a temperature range of 90° C. to 140° C., and more preferably within a temperature range of 100° C. to 130° C.

In the present invention, when the optical material comprised of the thiourethane resin is molded, according to the purpose, various additives such as a chain extender, a crosslinking agent, an oil-soluble dye, a filler, and an adhesion improver may be added to the composition, in addition to the "other components" described above.

[Plastic Spectacle Lens]

If necessary, the plastic spectacle lens comprised of the thiourethane resin of the present invention may be used after a coating layer is provided over one surface or both surfaces thereof.

The plastic spectacle lens of the present invention contains a lens substrate, which is comprised of the optical material obtained from the polymerizable composition, and a coating layer.

Specific examples of the coating layer include a primer layer, a hard coat layer, an antireflection layer, an antifogging coat layer, an antifouling layer, a water repellent layer, and the like. Each of these coating layers can be used singly, or a plurality of the coating layers can be used in the form of a multi-layer. When the coating layers are provided over both surfaces of the plastic spectacle lens, the same coating layer or different coating layers may be provided over the surfaces.

The plastic spectacle lens of the present invention can be obtained by a manufacturing method including a step of forming a primer layer, a hard coat layer, and an antireflection layer in this order over at least one surface of the lens substrate comprised of the optical material. Furthermore, other layers can also be formed over the lens substrate.

For each of the coating layers, an ultraviolet absorber for protecting the lens or the eye from ultraviolet rays, an infrared absorber for protecting the eye from infrared rays, alight stabilizer or an antioxidant for improving weather resistance of the lens, a dye or a pigment for making the lens more fashionable, a photochromic dye, a photochromic pigment, an antistatic agent, and other known additives for improving the performance of the lens can be concurrently used. For the layer to be subjected to coating, various leveling agents for improving coating properties may be used.

The primer layer is generally formed between the hard coat layer, which will be described later, and the lens. The primer layer is a coating layer for improving the adhesiveness between the hard coat layer to be formed over the primer layer and the lens. In some case, the primer layer can also improve impact resistance. For the primer layer, any material can be used as long as it exhibits a high degree of adhesiveness with respect to the obtained lens. However, generally, a primer composition or the like that contains a urethane-based resin, an epoxy-based resin, a polyester-based resin, a melanin-based resin, or polyvinylacetal as a main component is used. In order to adjust the viscosity of the primer composition, an appropriate solvent that does not exert an influence on the lens may be used for the composition. Needless to say, a solvent may not be used for the composition.

The primer layer can be formed by any of a coating method and a dry method. When the coating method is used, the lens is coated with the primer composition by a known coating method such as spin coating or dip coating, and then the resultant is solidified, whereby the primer layer is formed. When the dry method is used, the primer layer is formed by a known dry method such as a CVD method or a vacuum deposition method. In forming the primer layer, if necessary, in order to improve the adhesiveness, the lens surface may be subjected to preprocessing such as alkali processing, plasma processing, or ultraviolet processing.

The hard coat layer is a coating layer for imparting functions such as scratch resistance, abrasion resistance, moisture resistance, hot water resistance, heat resistance, and weather resistance to the lens surface.

For the hard coat layer, generally, a hard coat composition is used which contains an organic silicon compound having curability, one or more kinds of oxide particles of an element selected from the group of elements including Si, Al, Sn, Sb, Ta, Ce, La, Fe, Zn, W, Zr, In, and Ti and/or one or more kinds of particles composed of a composite oxide of two or more kinds of elements selected from the group of elements.

The hard coat composition preferably contains at least any of amines, amino acids, metal acetylacetonate complexes, organic acid metal salts, perchloric acids, salts of perchloric acids, acids, metal chlorides, and polyfunctional epoxy compounds, in addition to the aforementioned components. For the hard coat composition, an appropriate solvent that does not exert an influence on the lens may be used. Furthermore, a solvent may not be used for the composition.

Generally, the lens is coated with the hard coat composition by a known coating method such as spin coating or dip coating, and then the composition is cured, whereby the hard coat layer is formed. Examples of curing methods include thermal curing, curing methods performed by irradiation of energy rays such as ultraviolet rays or visible rays, and the like. In order to inhibit formation of interference fringes, a difference between the refractive index of the hard coat layer and the refractive index of the lens is preferably within a range of ±0.1.

Generally, the antireflection layer is formed over the hard coat layer if necessary. The antireflection layer is classified into an inorganic antireflection layer and an organic antireflection layer. The inorganic antireflection layer is comprised of an inorganic oxide such as $SiO_2$ or $TiO_2$ by a dry method such as a vacuum deposition method, a sputtering method, an ion plating method, an ion beam-assisted method, and a CVD method. The organic antireflection layer is comprised of a composition, which contains an organic silicon compound and silica-based particles having internal cavities, by a wet method.

The antireflection layer is composed of a single layer or multiple layers. When it is used in the form of a single layer, a value obtained by subtracting the refractive index of the antireflection layer from the refractive index of the hard coat layer preferably become lower at least equal to or greater than 0.1. In order to cause the antireflection layer to effectively perform an antireflection function, it is preferable to constitute the antireflection film with multiple films, and in this case, a film with a low refractive index and a film with a high refractive index are alternately laminated on each other. Even in this case, a difference in refractive index between the film with a low refractive index and the film with a high refractive index is preferably equal to or greater than 0.1. Examples of the film with a high refractive index include films of ZnO, $TiO_2$, $CeO_2$, $Sb_2O_5$, $SnO_2$, $ZrO_2$, $Ta_2O_5$, and the like, and examples of the film with a low refractive index include films of $SiO_2$ and the like.

If necessary, an antifogging layer, an antifouling layer, or a water repellent layer may be formed over the antireflection film layer. Regarding the method for forming the antifogging layer, the antifouling layer, and the water repellent layer, the method, material, and the like used for treating these layers are not particularly limited as long as they do not exert a negative influence on the antireflection function. It is possible to use known methods used for an antifogging treatment, an antifouling treatment, and a water repellency treatment and materials. Examples of the methods used for the antifogging treatment and the antifouling treatment include a method of covering the surface with a surfactant;

a method of giving water absorbing properties to the layer by adding a hydrophilic film to the surface of the layer; a method of improving the water absorbing properties by forming fine concavities and convexities on the surface of the layer; a method of giving water absorbing properties to the layer by utilizing photocatalytic activity; a method performing a super water repellency treatment on the layer to prevent water drops from adhering to the layer; and the like. Examples of the methods used for the water repellency treatment include a method of forming a water repellency treatment layer by vapor deposition or sputtering of a fluorine-containing silane compound or the like; a method of forming a water repellency treatment layer by dissolving a fluorine-containing silane compound in a solvent and then coating; and the like.

The plastic spectacle lens using the thiourethane resin of the present invention may be used after being dyed with a dye for such purpose, so that the lens becomes fashionable or exhibits chromogenic properties. The lens can be dyed by a known dyeing method, but generally, the following method is used.

Generally, the lens is dyed by a method in which an original plastic lens, which has undergone finishing to have a predetermined optical surface, is dipped in a dyeing liquid in which a dye to be used is dissolved or uniformly dispersed (dyeing step), and then the lens is heated if necessary to fix the dye (annealing step after dyeing). The dye used in the dyeing step is not particularly limited as long as it is a known dye, but generally, an oil-soluble dye or a disperse dye is used. The solvent used in the dyeing step is not particularly limited as long as the dye to be used can be dissolved or uniformly dispersed in the solvent. In the dyeing step, if necessary, a surfactant for dispersing the dye in the dyeing liquid or a carrier for accelerating dyeing may be added. During the dyeing step, a dye and a surfactant, which is added if necessary, are dispersed in water or a mixture consisting of water and an organic solvent so as to prepare a dyebath, the optical lens is dipped in the dyebath, and the lens is dyed for a predetermined time at a predetermined temperature. The dyeing temperature and time can be varied according to the intended color concentration. Generally, the lens may be dyed for a few minutes to tens of hours at a temperature equal to or lower than 120° C., and the dye concentration of the dyebath is set to be 0.01% by weight to 10% by weight. Moreover, when the lens is not easily dyed, dyeing may be performed under applying pressure. The annealing step after dyeing that is performed if necessary is a step of performing heating processing on the dyed original lens. In the heating processing, water remaining on the surface of the original lens, which has been dyed in the dyeing step, is removed by using a solvent or the like, or alternatively, the solvent is air-dried, and then the lens is caused to stay in a furnace such as an infrared heating furnace in the atmosphere or a resistance heating furnace. In the annealing step after dyeing, color loss of the dyed original lens is prevented (color loss-preventing processing), and water having penetrated inside of the original lens at the time of dyeing is removed.

[Plastic Polarizing Lens]

In the present invention, the plastic polarizing lens can be obtained by a manufacturing method including the following steps.

Step i: fixing a polarizing lens in a mold for molding a lens, in a state in which at least one surface of the polarizing film is separated from the mold Step ii: injecting the polymerizable composition of the present invention into a space between the polarizing film and the mold Step iii: polymerizing and curing the polymerizable composition by heating the composition, and laminating a layer comprised of a polyurethane resin over at least one surface of the polarizing film Hereinafter, each of the steps will be described in order.

(Step i)

A polarizing film comprised of thermoplastic polyester or the like is disposed in the internal space of the mold for molding a lens, such that at least one of the film surfaces becomes parallel to the inner surface of the mold facing the film surface. Between the polarizing film and the mold, a space is formed. The polarizing film may be shaped beforehand.

(Step ii)

Thereafter, within the internal space of the mold for molding a lens, by a predetermined injection unit, the polymerizable composition for an optical material of the present invention is injected into the space between the mold and the polarizing film.

(Step iii)

Then the mold for molding a lens, into which the polymerizable composition for an optical material has been injected and in which the polarizing film has been fixed, is heated for several hours to tens of hours according to a predetermined temperature program in a heating device such as an oven or water, thereby performing curing and molding.

The temperature of the polymerization and curing cannot be specified since the conditions vary with the makeup of the polymerizable composition, the type of the catalyst, the mold shape, and the like. However, the polymerization and curing is performed for 1 hour to 48 hours at a temperature of 0° C. to 140° C.

After the curing and molding ends, the molded article is taken out of the mold for molding a lens. In this way, it is possible to obtain the plastic polarizing lens of the present embodiment in which the layer comprised of a polyurethane resin is laminated over at least one surface of the polarizing film.

The released plastic polarizing lens of the present invention is desirably subjected to annealing processing performed by heating, such that strain resulting from polymerization is relieved.

If necessary, the plastic polarizing lens of the present invention is used after a coating layer is provided over one surface or both surfaces thereof. Examples of the coating layer include a primer layer, a hard coat layer, an antireflection layer, an antifogging coat layer, an antifouling layer, a water repellent layer, and the like, similarly to the plastic spectacle lens.

EXAMPLES

Hereinafter, the present invention will be more specifically described based on examples, but the present invention is not limited thereto.

The lens obtained by polymerization was evaluated by being subjected to performance tests. By the performance tests, a refractive index, an Abbe number, heat resistance, specific gravity, cloudiness, and striae were tested, and the lens was evaluated by the following test methods.

Refractive index (ne), Abbe number (ve): a refractive index and an Abbe number were measured at 20° C. by using a Pulfrich refractometer KPR-30 manufactured by Shimadzu Corporation.

Heat resistance: a glass transition temperature (Tg) measured by a TMA penetration method (load: 50 g, pin tip: 0.5 mmΦ) by using TMA-60 manufactured by Shimadzu Corporation was taken as heat resistance.

Specific gravity: a specific gravity was measured at 20° C. by an Archimedes method.

Cloudiness of resin: the prepared lens was visually observed by using a slide projector (CS-15 manufactured by CABIN (r)) as a light source. The lens in which cloudiness was not observed was evaluated to be "O", and the lens in which cloudiness was observed was evaluated to be "X".

Striae: the prepared lens was visually observed by using a high-pressure mercury lamp (manufactured by USHIO, INC.) as a light source. The lens in which striae were not observed was evaluated to be "O", and the lens in which striae were observed was evaluated to be "X".

Example 1

2.00 g of 1,2-dimethylimidazole as a catalyst was added to 8.00 g of Zelec UN (acidic phosphoric acid ester: registered trademark, manufactured by Stepan Company) as an internal release agent, and the components were mixed and dissolved together at room temperature until a uniform solution was formed, thereby preparing a catalyst/release agent master liquid. Furthermore, 49.50 g of bis(4-isocyanatocyclohexyl)methane was mixed with 8.74 g of 2,5(6)-bis(isocyanatomethyl)-bicyclo[2.2.1]heptane, and to this mixture, 1.50 g of Biosorb 583 as an ultraviolet absorber and 0.18 g of the catalyst/release agent master liquid prepared as above were added. These components were mixed and dissolved together at 20° C., thereby preparing a uniform solution. After the dissolution, 37.59 g of 4-mercaptomethyl-1,8-dimercapto-3,6-dithiaoctane and 4.17 g of diethylene glycol dimercaptopropionate were added thereto, and the components were mixed and dissolved together at 20° C., thereby preparing a uniform solution. After being degassed for 30 minutes at 150 Pa, the uniform solution was filtered through a 1 μm Teflon (registered trademark) filter and then injected into a mold consisting of a glass mold and a tape. The mold was put into an oven and gradually heated to 20° C. to 120° C. for over 35 hours so as to perform polymerization. After the polymerization ended, the mold was taken out of the oven, and the molded article was released from the mold, thereby obtaining a lens. Furthermore, the obtained resin was annealed for 4 hours at 120° C. The results of the performance evaluation of the obtained lens are summarized in Table 1.

Example 2

3.33 g of 1-benzyl-2-methylimidazole as a catalyst was added to 6.67 g of Zelec UN as an internal release agent, and the components were mixed and dissolved together at room temperature until a uniform solution was formed, thereby preparing a catalyst/release agent master liquid. A lens was obtained by performing polymerization in the same manner as in Example 1, except that 49.50 g of bis(4-isocyanatocyclohexyl)methane was mixed with 8.74 g of 2,5(6)-bis(isocyanatomethyl)-bicyclo[2.2.1]heptane; 1.50 g of Biosorb 583 as an ultraviolet absorber and 0.15 g of the catalyst/release agent master liquid prepared as above were added to the mixture; and the components were mixed and dissolved together at 20° C. The results of the performance evaluation of the obtained lens are summarized in Table 1.

Example 3

1.00 g of 1,2-dimethylimidazole and 1.66 g of 1-benzyl-2-methylimidazole as catalyst were added to 7.34 g of Zelec UN as an internal release agent, and the components were mixed and dissolved together at room temperature until a uniform solution was formed, thereby preparing a catalyst/release agent master liquid. A lens was obtained by performing polymerization in the same manner as in Example 1, except that 49.50 g of bis(4-isocyanatocyclohexyl)methane was mixed with 8.74 g of 2,5(6)-bis(isocyanatomethyl)-bicyclo[2.2.1]heptane; 1.50 g of Biosorb 583 as an ultraviolet absorber and 0.25 g of the catalyst/release agent master liquid prepared as above were added to the mixture; and the components were mixed and dissolved together at 20° C. The results of the performance evaluation of the obtained lens are summarized in Table 1.

Example 4

2.50 g of 1,2-dimethylimidazole as a catalyst was added to 7.50 g of JP-506H (manufactured by Johoku Chemical Co., Ltd.) as an internal release agent, and the components were mixed and dissolved together at room temperature until a uniform solution was formed, thereby preparing a catalyst/release agent master liquid. A lens was obtained by performing polymerization in the same manner as in Example 1, except that 49.50 g of bis(4-isocyanatocyclohexyl)methane was mixed with 8.74 g of 2,5(6)-bis(isocyanatomethyl)-bicyclo[2.2.1]heptane; 1.50 g of Biosorb 583 as an ultraviolet absorber and 0.20 g of the catalyst/release agent master liquid prepared as above were added to the mixture; and the components were mixed and dissolved together at 20° C. The results of the performance evaluation of the obtained lens are summarized in Table 1.

Example 5

4.00 g of 1-benzyl-2-methylimidazole as a catalyst was added to 6.00 g of JP-506H as an internal release agent, and the components were mixed and dissolved together at room temperature until a uniform solution was formed, thereby preparing a catalyst/release agent master liquid. A lens was obtained by performing polymerization in the same manner as in Example 1, except that 49.50 g of bis(4-isocyanatocyclohexyl)methane was mixed with 8.74 g of 2,5(6)-bis(isocyanatomethyl)-bicyclo[2.2.1]heptane; 1.50 g of Biosorb 583 as an ultraviolet absorber and 0.20 g of the catalyst/release agent master liquid prepared as above were added to the mixture; and the components were mixed and dissolved together at 20° C. The results of the performance evaluation of the obtained lens are summarized in Table 1.

Example 6

0.44 g of 1,2-dimethylimidazole and 2.60 g of 1-benzyl-2-methylimidazole as catalyst were added to 6.96 g of JP-506H as an internal release agent, and the components were mixed and dissolved together at room temperature until a uniform solution was formed, thereby preparing a catalyst/release agent master liquid. A lens was obtained by performing polymerization in the same manner as in Example 1, except that 49.50 g of bis(4-isocyanatocyclohexyl)methane was mixed with 8.74 g of 2,5(6)-bis(isocyanatomethyl)- bicyclo[2.2.1]heptane; 1.50 g of Biosorb 583 as an ultraviolet absorber and 0.32 g of the catalyst/release agent master liquid prepared as above were added to the mixture; and the components were mixed and dissolved together at 20° C. The results of the performance evaluation of the obtained lens are summarized in Table 1.

Example 7

2.00 g of 1,2-dimethylimidazole as a catalyst was added to 8.00 g of Zelec UN (acidic phosphoric acid ester: registered trademark, manufactured by Stepan Company) as an internal release agent, and the components were mixed and dissolved together at room temperature until a uniform solution was formed, thereby preparing a catalyst/release agent master liquid. Furthermore, 45.70 g of bis(4-isocyanatocyclohexyl)methane was mixed with 11.40 g of 2,5(6)-bis(isocyanatomethyl)-bicyclo[2.2.1]heptane, and to this mixture, 1.50 g of Biosorb 583 as an ultraviolet absorber and 0.18 g of the catalyst/release agent master liquid prepared as above were added. These components were mixed and dissolved together at 20° C. After dissolution, 35.80 g of 4-mercaptomethyl-1,8-dimercapto-3,6-dithiaoctane and 7.10 g of bis(3-mercaptopropionic acid) 1,4-butanediol were added to the resultant, and the components were mixed and dissolved together at 20° C., thereby preparing a uniform solution. After being degassed for 30 minutes at 150 Pa, the uniform solution was filtered through a 1 μm Teflon (registered trademark) filter and then injected into a mold consisting of a glass mold and a tape. The mold was put into an oven and gradually heated to 20° C. to 120° C. for over 35 hours so as to perform polymerization. After the polymerization ended, the mold was taken out of the oven, and the molded article was released from the mold, thereby obtaining a lens. Furthermore, the obtained resin was annealed for 4 hours at 120° C. The results of the performance evaluation of the obtained lens are summarized in Table 1.

Example 8

1.66 g of 1,2-dimethylimidazole as a catalyst was added to 8.43 g of JP-506H as an internal release agent, and the components were mixed and dissolved together at room temperature until a uniform solution was formed, thereby preparing a 1,2-dimethylimidazole catalyst/release agent master liquid. Moreover, 2.00 g of 1-benzyl-2-methylimidazole as a catalyst was added to 8.00 g of JP-506H as an internal release agent, and the components were mixed and dissolved together at room temperature until a uniform solution was formed, thereby preparing a 1-benzyl-2-methylimidazole catalyst/release agent master liquid. A lens was obtained by performing polymerization in the same manner as in Example 1, except that 50.60 g of 2,5(6)-bis(isocyanatomethyl)-bicyclo[2.2.1]heptane, 1.50 g of Biosorb 583 as an ultraviolet absorber, and 0.05 g of the 1,2-dimethylimidazole catalyst/release agent master liquid and 0.20 g of the 1-benzyl-2-methylimidazole catalyst/release agent master liquid prepared as above were mixed and dissolved together at 20° C.; then 23.90 g of pentaerythritol tetrakis(3-mercaptopropionate) and 25.50 g of 4-mercaptomethyl-1,8-dimercapto-3,6-dithiaoctane were added to the mixture; and the components were mixed and dissolved together at 20° C. The results of the performance evaluation of the obtained lens are summarized in Table 1.

Example 9

1.33 g of 1-benzyl-2-methylimidazole as a catalyst was added to 8.67 g of Zelec UN (acidic phosphoric acid ester: registered trademark, manufactured by Stepan Company) as an internal release agent, and the components were mixed and dissolved together at room temperature until a uniform solution was formed, thereby preparing a catalyst/release agent master liquid. A lens was obtained by performing polymerization in the same manner as in Example 1, except that 52.00 g of m-xylylene diisocyanate, 1.50 g of Biosorb 583 as an ultraviolet absorber, and 0.10 g of the catalyst/release agent master liquid prepared as above were mixed and dissolved together; then 48.00 g of 4-mercaptomethyl-1,8-dimercapto-3,6-dithiaoctane was added to the mixture; and the components were mixed and dissolved together at 20° C. The results of the performance evaluation of the obtained lens are summarized in Table 1.

Example 10

1.33 g of 1-benzyl-2-methylimidazole as a catalyst was added to 8.67 g of Zelec UN (acidic phosphoric acid ester: registered trademark, manufactured by Stepan Company) as an internal release agent, and the components were mixed and dissolved together at room temperature until a uniform solution was formed, thereby preparing a catalyst/release agent master liquid. A lens was obtained by performing polymerization in the same manner as in Example 1, except that 50.6 g of m-xylylene diisocyanate, 1.50 g of Biosorb 583 as an ultraviolet absorber, and 0.10 g of the catalyst/release agent master liquid prepared as above were mixed and dissolved together; then 49.4 g of polythiol, which contained 4,8-dimercaptomethyl-1,11-dimercapto-3,6,9-trithiaundecane, 4,7-dimercaptomethyl-1,11-dimercapto-3,6,9-trithiaundecane, and 5,7-dimercaptomethyl-1,11-dimercapto-3,6,9-trithiaundecane as main components, was added to the mixture; and the components were mixed and dissolved together at 20° C. The results of the performance evaluation of the obtained lens are summarized in Table 1.

Comparative Example 1

1.82 g of triethylamine as a catalyst was added to 8.18 g of Zelec UN as an internal release agent, and the components were mixed and dissolved together at room temperature until a uniform solution was formed, thereby preparing a catalyst/release agent master liquid. A lens was obtained by performing polymerization in the same manner as in Example 1, except that 49.50 g of bis(4-isocyanatocyclohexyl)methane was mixed with 8.74 g of 2,5(6)-bis(isocyanatomethyl)-bicyclo[2.2.1]heptane; 1.50 g of Biosorb 583 as an ultraviolet absorber and 0.088 g of the catalyst/release agent master liquid prepared as above were added to the mixture; and the components were mixed and dissolved together at 20° C. The results of the performance evaluation of the obtained lens are summarized in Table 1.

Comparative Example 2

1.82 g of triethylamine as a catalyst was added to 8.18 g of Zelec UN as an internal release agent, and the components were mixed and dissolved together at room temperature until a uniform solution was formed, thereby preparing a catalyst/release agent master liquid. A lens was obtained by performing polymerization in the same manner as in Example 1, except that 49.50 g of bis(4-isocyanatocyclohexyl)methane was mixed with 8.74 g of 2,5(6)-bis(isocyanatomethyl)-bicyclo[2.2.1]heptane; 1.50 g of Biosorb 583 as an ultraviolet absorber and 0.50 g of the catalyst/release agent master liquid prepared as above were added to the mixture; and the components were mixed and dissolved together at 20° C. The results of the performance evaluation of the obtained lens are summarized in Table 1.

Comparative Example 3

2.00 g of triethylamine as a catalyst was added to 8.00 g of JP-506H as an internal release agent, and the components were mixed and dissolved together at room temperature until a uniform solution was formed, thereby preparing a catalyst/release agent master liquid. A lens was obtained by performing polymerization in the same manner as in Example 1, except that 49.50 g of bis(4-isocyanatocyclohexyl)methane was mixed with 8.74 g of 2,5(6)-bis(isocyanatomethyl)-bicyclo[2.2.1]heptane; 1.50 g of Biosorb 583 as an ultraviolet absorber and 0.30 g of the catalyst/release agent master liquid prepared as above were added to the mixture; and the components were mixed and dissolved together at 20° C. The results of the performance evaluation of the obtained lens are summarized in Table 1.

Comparative Example 4

1.00 g of triethylamine as a catalyst was added to 9.00 g of Zelec UN (acidic phosphoric acid ester: registered trademark, manufactured by Stepan Company) as an internal release agent, and the components were mixed and dissolved together at room temperature until a uniform solution was formed, thereby preparing a catalyst/release agent master liquid. A lens was obtained by performing polymerization in the same manner as in Example 1, except that 50.60 g of 2,5(6)-bis(isocyanatomethyl)-bicyclo[2.2.1]heptane, 1.50 g of Biosorb 583 as an ultraviolet absorber, and 0.10 g of the catalyst/release agent master liquid prepared as above were mixed and dissolved together at 20° C.; then 23.90 g of pentaerythritol tetrakis(3-mercaptopropionate) and 25.50 g of 4-mercaptomethyl-1,8-dimercapto-3,6-dithiaoctane were added to the mixture; and the components were mixed and dissolved together at 20° C.

The results of the performance evaluation of the lens are summarized in Table 1.

Comparative Example 5

1.5 g of triethylamine as a catalyst was added to 8.50 g of Zelec UN (acidic phosphoric acid ester: registered trademark, manufactured by Stepan Company) as an internal release agent, and the components were mixed and dissolved together at room temperature until a uniform solution was formed, thereby preparing a catalyst/release agent master liquid. A lens was obtained by performing polymerization in the same manner as in Example 1, except that 50.60 g of 2,5(6)-bis(isocyanatomethyl)-bicyclo[2.2.1]heptane, 1.50 g of Biosorb 583 as an ultraviolet absorber, and 0.10 g of the catalyst/release agent master liquid prepared as above were mixed and dissolved together at 20° C.; then 23.90 g of pentaerythritol tetrakis(3-mercaptopropionate) and 25.50 g of 4-mercaptomethyl-1,8-dimercapto-3,6-dithiaoctane were added to the mixture; and the components were mixed and dissolved together at 20° C. The results of the performance evaluation of the lens are summarized in Table 1.

TABLE 1

| Exp. No. | | (A) Alicyclic isocyanate (a1) | (A) Aliphatic isocyanate (a2) | (B) Thiol compound (b1) | (B) Thiol compound (b2) | (C) Imidazole-based curing catalyst | (C) Amount of catalyst (ppm) | Curing catalyst | Amount of catalyst (ppm) | Refractive index [ne] | Abbe number [ve] | Heat resistance [° C.] | Specific gravity [20° C.] | Presence of cloudiness (visual observation) | Presence of striae (visual observation) |
|---|---|---|---|---|---|---|---|---|---|---|---|---|---|---|---|
| Example | 1 | Compound (1) Compound (2) | — | Compound (4) | Compound (6) | DMIM | 360 ppm | — | — | 1.599 | 39 | 117 | 1.23 | ○ | ○ |
| | 2 | Compound (1) Compound (2) | — | Compound (4) | Compound (6) | BMIM | 500 ppm | — | — | 1.599 | 39 | 116 | 1.23 | ○ | ○ |
| | 3 | Compound (1) Compound (2) | — | Compound (4) | Compound (6) | DMIM BMIM | 665 ppm | — | — | 1.599 | 39 | 118 | 1.23 | ○ | ○ |
| | 4 | Compound (1) Compound (2) | — | Compound (4) | Compound (6) | DMIM | 500 ppm | — | — | 1.599 | 39 | 119 | 1.23 | ○ | ○ |
| | 5 | Compound (1) Compound (2) | — | Compound (4) | Compound (6) | BMIM | 800 ppm | — | — | 1.599 | 39 | 117 | 1.23 | ○ | ○ |
| | 6 | Compound (1) Compound (2) | — | Compound (4) | Compound (6) | DMIM BMIM | 973 ppm | — | — | 1.599 | 39 | 117 | 1.23 | ○ | ○ |
| | 7 | Compound (1) Compound (2) | — | Compound (4) | Compound (7) | DMIM | 360 ppm | — | — | 1.597 | 39 | 115 | 1.24 | ○ | ○ |
| | 8 | Compound (1) Compound (2) | — | Compound (4) | Compound (8) | DMIM BMIM | 480 ppm | — | — | 1.596 | 39 | 110 | 1.30 | ○ | ○ |
| | 9 | — | Compound (3) | Compound (4) | — | BMIM | 130 ppm | — | — | 1.664 | 31 | 87 | 1.35 | ○ | ○ |
| | 10 | — | Compound (3) | Compound (5) | — | BMIM | 130 ppm | — | — | 1.668 | 31 | 101 | 1.36 | ○ | ○ |
| Comparative example | 1 | Compound (1) Compound (2) | — | Compound (4) | Compound (6) | — | — | TEA | 160 ppm | 1.599 | 39 | 107 | 1.22 | X | X |
| | 2 | Compound (1) Compound (2) | — | Compound (4) | Compound (6) | — | — | TEA | 910 ppm | 1.599 | 39 | 116 | 1.23 | X | X |

TABLE 1-continued

| Exp. No. | (A) Alicyclic isocyanate (a1) | (A) Aliphatic isocyanate (a2) | (B) Thiol compound (b1) | (B) Thiol compound (b2) | (C) Imidazole-based curing catalyst | (C) Amount of catalyst (ppm) | Curing catalyst | Amount of catalyst (ppm) | Refractive index [ne] | Abbe number [ve] | Heat resistance [° C.] | Specific gravity [20° C.] | Presence of cloudiness (visual observation) | Presence of striae (visual observation) |
|---|---|---|---|---|---|---|---|---|---|---|---|---|---|---|
| 3 | Compound (1) Compound (2) | — | Compound (4) | Compound (6) | — | — | TEA | 600 ppm | 1.599 | 39 | 116 | 1.23 | X | X |
| 4 | Compound (1) | — | Compound (4) | Compound (8) | — | — | TEA | 100 ppm | 1.594 | 39 | 90 | 1.29 | X | ○ |
| 5 | Compound (1) | — | Compound (4) | Compound (8) | — | — | TEA | 150 ppm | 1.595 | 39 | 96 | 1.29 | ○ | X |

Thiol compound (b1): a thiol compound having one or more sulfide bonds and two or more functional groups
Thiol compound (b2): a thiol compound having one or more ester bonds and two or more functional groups
Catalyst amount (ppm): the amount of a curing catalyst with respect to the total amount of the isocyanate compound (A) and the thiol compound (B)
Compound (1): 2,5(6)-bis(isocyanatomethyl)-bicyclo[2.2.1]heptane
Compound (2): bis(4-isocyanatocyclohexyl)methane
Compound (3): m-xylylene diisocyanate
Compound (4): 4-mercaptomethyl-1,8-dimercapto-3,6-dithiaoctane
Compound (5): polyol containing 4,8-dimercaptomethyl-1,11-dimercapto-3,6,9-trithiaundecane, 4,7-dimercaptomethyl-1,11-dimercapto-3,6,9-trithiaundecane, and 5,7-dimercaptomethyl-1,11-dimercapto-3,6,9-trithiaundecane as main components
Compound (6): diethylene glycol dimercaptopropionate
Compound (7): bis(3-mercaptopropionic acid) 1,4-butanediol
Compound (8): pentaerythritol tetrakis(3-mercaptopropionate)
DMIM: 1,2-dimethylimidazole
BMIM: 1-benzyl-methylimidazole
TEA: triethylamine From the results of Examples 1 to 10, it is understood that the polymerizable composition of the present invention containing an imidazole-based curing catalyst in a predetermined amount satisfies optical properties such as heat resistance and a refractive index required for lens products, and makes it possible to obtain a lens in which cloudiness or striae are further inhibited, compared to the polymerizable compositions containing the triethylamine catalyst shown in Comparative examples 1 to 5. Moreover, because the polymerizable composition of the present invention uses the imidazole-based curing catalyst in a predetermined amount and does not use a metal-containing compound as a catalyst, a lens extremely safe for the human body or the environment can be obtained.

The present application claims priority based on Japanese Patent Application No. 2012-251913 filed on Nov. 16, 2012, the entire disclosure of which is incorporated herein.

The present invention can also employ the following embodiments.

[1] A polymerizable composition containing: (A) an alicyclic isocyanate compound (a1) having two or more functional groups and/or an aliphatic isocyanate compound (a2) having two or more functional groups; (B) a thiol compound having one or more sulfide bonds and/or one or more ester bonds and having two or more functional groups; and (C) an imidazole-based curing catalyst, in which the amount of the imidazole-based curing catalyst (C) is 5 ppm to 3,000 ppm with respect to the total amount of the isocyanate compound (A) and the thiol compound (B).

[2] The polymerizable composition described in [1], in which the alicyclic isocyanate compound (a1) is at least one kind selected from the group consisting of 1,3-bis(isocyanatomethyl)cyclohexane, 1,4-bis(isocyanatomethyl)cyclohexane, bis(4-isocyanatocyclohexyl)methane, bis(isocyanatomethyl)-bicyclo[2.2.1]heptane, and isophorone diisocyanate, and the aliphatic isocyanate compound (a2) is at least one kind selected from the group consisting of m-xylylene diisocyanate, hexamethylene diisocyanate, and pentamethylene diisocyanate.

[3] The polymerizable composition described in [1] or [2], in which in the thiol compound (B), the thiol compound having one or more sulfide bonds and two or more functional groups is at least one kind selected from the group consisting of 4-mercaptomethyl-1,8-dimercapto-3,6-dithiaocatane, 4,8-, 4,7-, or 5,7-dimercaptomethyl-1,11-dimercapto-3,6,9-trithiaundecane, bis(mercaptoethyl)sulfide, 2,5-bis(mercaptomethyl)-1,4-dithiane, 1,1,3,3-tetrakis(mercaptomethylthio)propane, 4,6-bis(mercaptomethylthio)-1,3-dithiane, and 2-(2,2-bis(mercaptomethylthio)ethyl)-1,3-dithietane.

[4] The polymerizable composition described in any one of [1] to [3], in which in the thiol compound (B), the thiol compound having one or more ester bonds and two or more functional groups is at least one kind selected from the group consisting of pentaerythritol tetrakismercaptoacetate, pentaerythritol tetrakismercaptopropionate, and a thiol compound represented by the following Formula (1),

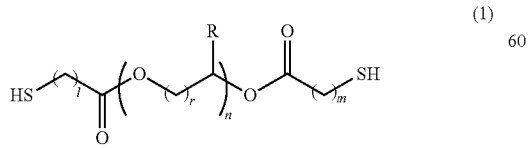

(1)

wherein, in the formula, each of 1, m, and r independently represents an integer of 1 to 4; n represents an integer of 1 to 3, R represents hydrogen or a methyl group; and when there is a plurality of Rs, Rs may be the same as or different from each other.

[5] The polymerizable composition described in any one of [1] to [4], in which the imidazole-based curing catalyst (C) includes at least one kind of compound represented by the following Formula (2),

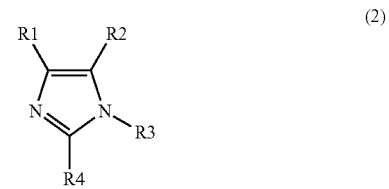

(2)

wherein, in the formula, each of R1, R2, R3, and R4 independently represents hydrogen, a mercapto group, a cyano group, an alkyl group which may be substituted, or a phenyl group which may be substituted; and R1, R2, R3, and R4 may be the same as or different from each other).

[6] The polymerizable composition described in any one of [1] to [5], in which the imidazole-based curing catalyst (C) is at least one kind selected from the group consisting of dimethylimidazole and benzylmethylimidazole.

[7] The polymerizable composition described in any one of [4] to [6], in which in the thiol compound represented by Formula (1), each of 1 and m independently represents an integer of 1 to 2, and r and n represent 1.

[8] An optical material comprised of the polymerizable composition described in any one of [1] to [7].

[9] A manufacturing method of an optical material, including a step of molding the polymerizable composition described in any one of [1] to [7] by cast polymerization.

[10] A plastic spectacle lens in which a primer layer, a hard coat layer, and an antireflection layer are laminated in this order over a substrate comprised of the polymerizable composition described any one of [1] to [7].

[11] A manufacturing method of a plastic spectacle lens, including a step of molding a substrate by performing cast polymerization of the polymerizable composition described in any one of [1] to [7], and a step of forming a primer layer, a hard coat layer, and an antireflection layer in this order over the substrate.

The invention claimed is:

1. A polymerizable composition consisting of:
(A) an alicyclic isocyanate compound (a1) having two or more functional groups and/or an aliphatic isocyanate compound (a2) having two or more functional groups;
(B) a thiol compound (b1) having one or more sulfide bonds and two or more functional groups or a thiol compound (b2) having one or more ester bonds and two or more functional groups;
(C) an imidazole-based curing catalyst; and
optionally one or more additives selected from the group consisting of an active hydrogen compound, an internal release agent, a resin modifier, a light stabilizer, a bluing agent, an ultraviolet absorber, an antioxidant, a coloring inhibitor, and a dye,
wherein the amount of the imidazole-based curing catalyst (C) is 100 ppm to 1,000 ppm with respect to the total amount of (A) an isocyanate compound and (B) a thiol compound,
wherein the thiol compound (b1) is at least one selected from group consisting of 4-mercaptomethyl-1,8-dimercapto-3,6-dithiaoctane, 4,8-, 4,7- or 5,7-dimercaptomethyl-1,11-dimercapto-3,6,9-trithiaundecane, tetrakis(mercaptomethyl)methane, bis(mercaptomethyl)sulfide, 2,5-bis(mercaptomethyl)-1,4-dithiane, bis(mercaptomethyl)disulfide, bis(mercaptoethyl)sulfide, bis(mercaptoethyl)disulfide, bis(mercaptomethylthio)methane, bis(2-mercaptoethylthio)methane, 1,2-bis(mercaptomethylthio)ethane, 1,2-bis(2-mercaptoethylthio)ethane, 1,3-bis(mercaptomethylthio)propane, 1,3-bis(2-mercaptoethylthio)propane, 1,2,3-tris(mercaptomethylthio)propane, 1,2,3-tris(2-mercaptoethylthio)propane, 1,2,3-tris(3-mercaptopropylthio)propane, 1,1,3,3-tetrakis(mercaptomethylthio)propane, 4,6-bis(mercaptomethylthio)-1,3-dithiane, 2-(2,2-bis(mercaptomethylthio)ethyl)-1,3-dithietane, tetrakis(mercaptomethylthiomethyl)methane, tetrakis(2-mercaptoethylthiomethyl)methane, bis(2,3-dimercaptopropyl)sulfide, the thiol compound (b2) is at least one selected from group consisting of 2,3-dimercapto-1-propanol(3-mercaptopropionate), 3-mercapto-1,2-propanediol bis(2-mercaptoacetate), 3-mercapto-1,2-propanediol di(3-mercaptopropionate), trimethylolpropane tris(2-mercaptoacetate), trimethylolpropane tris(3-mercaptopropionate), trimethylolethane tris(2-mercaptoacetate), trimethylolethane tris(3-mercaptopropionate), pentaerythritol tetrakis(2-mercaptoacetate), pentaerythritol tetrakis(3-mercaptopropionate), pentaerythritol bis(3-mercaptopropionate), pentaerythritol tris(3-mercaptopropionate), glycerin tris(2-mercaptoacetate), glycerin tris(3-mercaptopropionate), 1,4-cyclohexanediol bis(2-mercaptoacetate), 1,4-cyclohexanediol bis(3-mercaptopropionate), hydroxymethylsulfide bis(2-mercaptoacetate), hydroxymethylsulfide bis(3-mercaptopropionate), thioglycolic acid bis(2-mercaptoethylester), thiodipropionic acid bis(2-mercaptoethylester), hydroxyethylsulfide (2-mercaptoacetate), hydroxyethylsulfide (3-mercaptopropionate), a thiol compound represented by the following Formula (1);

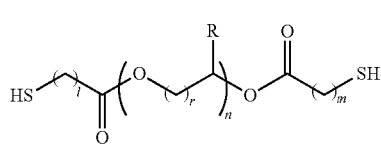

wherein each of l, m, and r independently represents an integer of 1 to 4, and n represents an integer of 1 to 3, R represents hydrogen or a methyl group, and when there is a plurality of Rs, Rs may be the same as or different from each other, the imidazole-based curing catalyst (C) is at least one kind selected from the group consisting of dimethylimidazole and benzylmethylimidazole, and excluding the case using a metal-containing compound as a catalyst.

2. The polymerizable composition according to claim 1, wherein the alicyclic isocyanate compound (a1) is at least one kind selected from the group consisting of 1,3-bis(isocyanatomethyl)cyclohexane, 1,4-bis(isocyanatomethyl)cyclohexane, bis(4-isocyanatocyclohexyl)methane, bis(isocyanatomethyl)-bicyclo[2.2.1]heptane, and isophorone diisocyanate, and the aliphatic isocyanate compound (a2) is at least one kind selected from the group consisting of m-xylylenediisocyanate, hexamethylene diisocyanate, and pentamethylene diisocyanate.

3. The polymerizable composition according to claim 1, wherein the thiol compound (b1) is at least one kind selected from the group consisting of 4-mercaptomethyl-1,8-dimercapto-3,6-dithiaocatane, 4,8-, 4,7-, or 5,7-dimercaptomethyl-1,11 -dimercapto-3,6,9-trithiaundecane, bis(mercaptoethyl)sulfide, 2,5-bis(mercaptomethyl)-1,4-dithiane, 1,1,3,3-tetrakis(mercaptomethylthio)propane, 4,6-bis(mercaptomethylthio)-1,3-dithiane, and 2-(2,2-bis(mercaptomethylthio)ethyl)-1,3-dithietane.

4. The polymerizable composition according to claim 1, wherein the thiol compound (b2) is at least one kind selected from the group consisting of pentaerythritol tetrakis(2-mercaptoacetate), pentaerythritol tetrakis(3-mercaptopropionate), and a thiol compound represented by the following Formula (1),

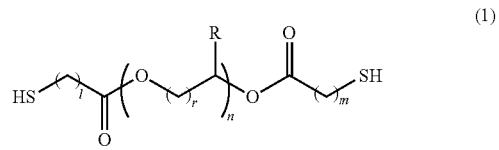

wherein, in the formula, each of l, m, and r independently represents an integer of 1 to 4; n represents an integer of 1 to 3; R represents hydrogen or a methyl group; and when there is a plurality of Rs, Rs may be the same as or different from each other.

5. The polymerizable composition according to claim 4, wherein in the thiol compound represented by Formula (1), each of l and m independently represents an integer of 1 to 2, r represents an integer of 1 to 3, and n represents 1 or 2.

6. An optical material comprised of the polymerizable composition according to claim 1.

7. A manufacturing method of an optical material, comprising:
a step of casting the polymerizable composition according to claim 1 into a mold; and
a step of polymerizing the polymerizable composition by heating.

8. A plastic spectacle lens in which a primer layer, a hard coat layer, and an antireflection layer are laminated in this order over a substrate comprised of the polymerizable composition according to claim 1.

9. A manufacturing method of a plastic spectacle lens, comprising:
a step of casting the polymerizable composition according to claim 1 into a mold;
a step of obtaining a lens substrate by polymerizing the polymerizable composition by heating the composition; and
a step of forming a primer layer, a hard coat layer, and an antireflection layer in this order over at least one surface of the lens substrate.

* * * * *